US008401472B2

(12) United States Patent
Gerstenkorn

(10) Patent No.: US 8,401,472 B2
(45) Date of Patent: Mar. 19, 2013

(54) METHOD OF GUIDING A USER IN AN ENVIRONMENT, PARTICULARLY IN A BUILDING

(75) Inventor: Bernhard Gerstenkorn, Ebikon (CH)

(73) Assignee: Inventio AG, Hergiswil NW (CH)

( * ) Notice: Subject to any disclaimer, the term of this patent is extended or adjusted under 35 U.S.C. 154(b) by 803 days.

(21) Appl. No.: 11/460,033

(22) Filed: Jul. 26, 2006

(65) Prior Publication Data

US 2007/0026802 A1 Feb. 1, 2007

(30) Foreign Application Priority Data

Jul. 28, 2005 (EP) .................................... 05106992

(51) Int. Cl.
*H04B 7/00* (2006.01)

(52) U.S. Cl. ........ 455/41.2; 187/380; 187/383; 187/391

(58) Field of Classification Search .................. 455/41.2
See application file for complete search history.

(56) References Cited

U.S. PATENT DOCUMENTS

| | | | | |
|---|---|---|---|---|
| 4,979,594 | A | 12/1990 | Begle et al. | |
| 6,109,396 | A * | 8/2000 | Sirag et al. | 187/381 |
| 6,223,160 | B1 | 4/2001 | Kostka et al. | |
| 6,320,496 | B1 * | 11/2001 | Sokoler et al. | 340/407.1 |
| 6,382,363 | B1 | 5/2002 | Friedli | |
| 6,801,792 | B1 | 10/2004 | Schuster et al. | |
| 8,047,333 | B2 * | 11/2011 | Finschi | 187/382 |
| 2002/0077749 | A1 * | 6/2002 | Doi | 701/209 |
| 2002/0130763 | A1 * | 9/2002 | Aslanidis et al. | 340/5.61 |
| 2003/0125868 | A1 * | 7/2003 | Giannopoulos et al. | 701/200 |
| 2003/0142016 | A1 * | 7/2003 | Pickup | 342/387 |
| 2004/0006699 | A1 * | 1/2004 | von Mueller et al. | 713/185 |
| 2005/0138385 | A1 * | 6/2005 | Friedli et al. | 713/182 |
| 2006/0094443 | A1 * | 5/2006 | Dowling et al. | 455/456.1 |
| 2006/0129308 | A1 * | 6/2006 | Kates | 701/200 |
| 2006/0135183 | A1 * | 6/2006 | Zavada et al. | 455/457 |
| 2006/0166703 | A1 * | 7/2006 | Karaoguz et al. | 455/566 |
| 2006/0286972 | A1 * | 12/2006 | Kates | 455/415 |
| 2007/0131487 | A1 * | 6/2007 | Kontturi et al. | 187/391 |

FOREIGN PATENT DOCUMENTS

| | | | |
|---|---|---|---|
| DE | 19858450 | A1 | 6/2000 |
| DE | 10121260 | A1 | 11/2002 |
| EP | 1014600 | A2 | 6/2000 |
| EP | 1 329 409 | A1 | 7/2003 |
| JP | 02056093 | A | 2/1990 |
| JP | 2002310717 | A | 10/2002 |
| JP | 2005134952 | A | 5/2005 |
| JP | 2005157697 | A | 6/2005 |
| WO | WO 2005/030628 | A1 | 4/2005 |

* cited by examiner

*Primary Examiner* — Nay A Maung
*Assistant Examiner* — Erica Fleming-Hall
(74) *Attorney, Agent, or Firm* — Fraser Clemens Martin & Miller LLC; William J. Clemens

(57) ABSTRACT

A method of guiding a user in an environment particularly in a building, utilizes at least one first communications unit communicating data to a mobile second communications unit carried by the user. The first communications unit transmits a contact signal within a predetermined range for establishing contact with the second communications unit. If the second communications unit is located within the range and receives the contact signal, contact is established between the first communications and the second communications unit. In order to enable guidance of the user through the environment by means of the second communications unit, data are communicated from the first communications unit to the second communications unit.

18 Claims, 1 Drawing Sheet

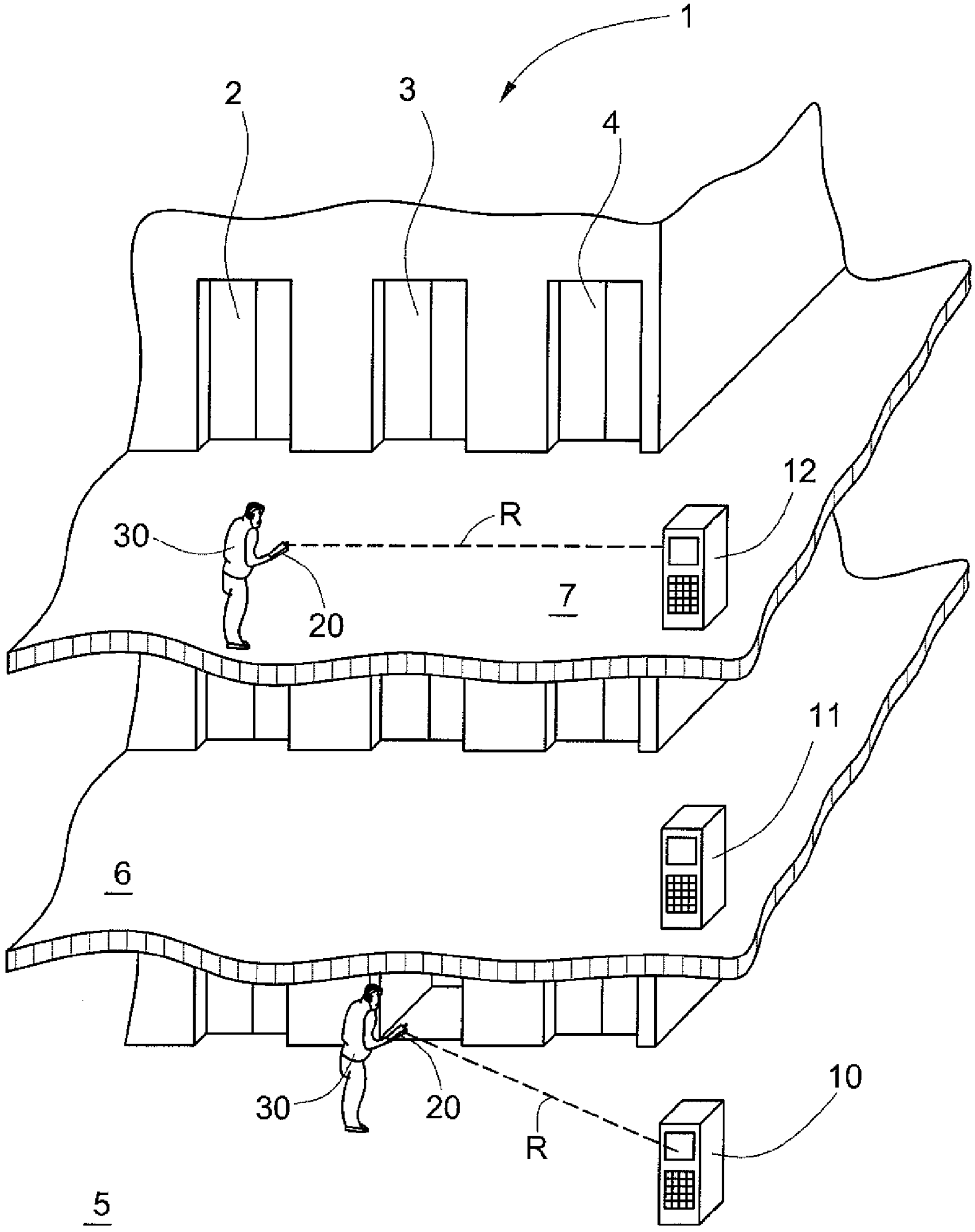
1
2
3
4
12
R
30
20
7
11
6
30
20
R
10
5

METHOD OF GUIDING A USER IN AN ENVIRONMENT, PARTICULARLY IN A BUILDING

BACKGROUND OF THE INVENTION

The present invention relates to a method of guiding a user in an environment, particularly in a building, wherein at least one first communications unit communicates data to a mobile second communications unit carried by the user.

Modern office buildings are frequently equipped with a wireless communications system for guidance of a user in the office building. In this connection the data, which are required for the guidance of the user, are usually called up by stationary terminals with a touch-screen display screen by way of an appropriate menu guide. In addition, systems are known in which the user carries a mobile communications unit during a stay in the building.

In the known method for guiding a user in a building the disadvantage exists that the user does indeed obtain much data, but cannot control which information he or she actually wants to obtain and does not want to obtain. Moreover, the user has to note important items of information or call these up again after a certain time.

A system for guidance of a user in a building is known from European patent application EP 1 329 409 A1. This access control and guidance system comprises at least one transmitter/receiver unit for communication with a communication means of the user as well as at least one computer equipment for preparation of items of information for the user. The transmitter/receiver unit serves the purpose of identifying the communications means of the user locally within the building. The computer equipment communicates data, by way of the transmitter/receiver unit, for guidance of the user in the building to the communications means.

In the case of the known access control and guidance system it has proved disadvantageous that for localization of the communications means several transmitter/receiver units simultaneously transmit code sequences for localization of the communications means, whereby on the one hand superimposition of the code sequences can occur particularly in the case of a number of users. On the other hand, the localization of the user is made difficult due to the fact that the identification code transmitted by the communications unit reaches several transmitter/receiver units. Even in the case that two transmitter/receiver units, which for example are arranged on two different floors, receive the identification code it is not possible for the computer unit to distinguish whether the communications means and thus the user is located in the vicinity of one transmitter/receiver unit or the other transmitter/receiver unit. If the actual position of the user cannot be correctly recognized, this leads to communication of false items of information and the user cannot find the desired destination.

SUMMARY OF THE INVENTION

The present invention has an object of so developing a method for guidance of the user in an environment, particularly in a building, that on the one hand the user can be precisely localized and on the other hand the user depending on his or her position can be supplied, by way of a communications unit located in the vicinity of the user, with data for guidance within the building. In particular, a reliable data transmission to the user shall be carried out.

For fulfillment of this object it is provided in accordance with the present invention in the case of a method for guidance of the user in an environment, particularly in a building, wherein at least one communications unit communicates data to a mobile second communications unit carried by the user, in correspondence with the method comprising the following steps:

a) transmitting a contact signal by the first communications unit within a predetermined range for establishing contact with the second communications unit;

b) establishing contact between the first communications unit and the second communications unit when the second communications unit is located within the range and receives the contact signal and c) communicating the data from the first communications unit to the second communications unit for guidance of the user through the environment by means of the second communications unit when the second communications unit is located within the range.

An environment is a location where many people come together, such as, for example, a building, a factory area, a high-rise structure, a shopping centre, a town precinct, a leisure part, a railway station, an airport, a swimming pool and a sports stadium.

The method according to the present invention is based on the recognition that the user can be localized depending on the respective whereabouts within the building or also at a specific distance outside the building and the requisite data can thereupon be selectively communicated to the second communications unit and thus to the user. In this way the user does not have to note the entrance by which he or she has entered the building or the parking place where he or she has left a motor vehicle in order on leaving the building to take the correct exit or to find again the parking place of the motor vehicle.

In an advantageous development of the method it is provided that in step c) the access authorization of the user to the environment is checked before transmission of the data from the first communications unit to the second communications unit and the data are transmitted only if the check is successful. It can be ensured by this measure that only persons with access authorization obtain information for guidance in the building. In this connection it has additionally proved advantageous if the data transmission to the second communications unit is carried out in dependence on the access authorization. Thus, the data to be transmitted can be selected in focused manner, whereby the user has to be supplied with less data and, with respect to security-relevant aspects, only with such data as there is entitlement within the scope of his or her access authorization.

In a development of the method according to the present invention it is proposed that the second communications unit communicates an access code to the first communications unit. The communication can take place on the one hand through selection of a specific access code by the second communications unit by way of an appropriate menu selection and on the other hand the data can be automatically communicated on entry into the building.

Moreover, it is of advantage if the access code is communicated only at specific points in time and/or within a specific time period. It is thereby prevented that the transfer process of the access code has to be ended by the user and that possibly unauthorized persons can gain access.

In a further advantageous refinement of the method the data are communicated only at specific points in time and/or within a specific time period from the first communications unit to the second communications unit or from the second communications unit to the first communications unit. Thus, different groups of persons can be allocated data established at specific times of day.

In order to be able to selectively influence the information flow the communication of specific data is selected by means of the second communications unit. In this way only a specific item of information is communicated to the user.

According to a preferred development of the method the contact signal is transmitted at specific times and/or over a specific time period. This enables reduction in the energy supply and is particularly suitable for less frequented regions of the building. In other words, the transmission of the contact signal to different parts of the building can take place at different times.

In order to guide the user in a suitable manner through the building the data are made known by way of an indicating unit, particularly an optical indicating unit. Advantageously, the display of a mobile telephone is used for that purpose. Alternatively, the data can also be made known by way of a speech output, for example by means of the mobile telephone.

A mobile telephone is preferably used as second communications unit. It is thus possible to avoid an obligation on the user to carry, apart from his or her mobile telephone, a further mobile communications unit. The first communications unit is preferably a stationary terminal, which is equipped with, in particular, a loudspeaker and a display. Preferably a plurality of terminals is placed in distribution at conspicuous points of the building, particularly in the region of the entrances and exits, in the region of the elevator installation and in the region of an underground car park.

In a preferred development of the method it is provided that the range is less than ten meters. This means that the contact signal for establishing contact with the second communications unit is transmitted only in a surrounding area of ten meters around the first communications unit. As a consequence of the comparatively small range, on the one hand superimposition of several signals is avoided and on the other hand a precise location of the whereabouts of the user is possible. Beyond that, it has proved advantageous that for data transmission within such a range it is possible to make use of, in particular, the Bluetooth and/or the NFC standard as transmission standard.

DESCRIPTION OF THE DRAWINGS

The above, as well as other, advantages of the present invention will become readily apparent to those skilled in the art from the following detailed description of a preferred embodiment when considered in the light of the accompanying drawings in which:

FIG. 1 is a schematic perspective view of a building with a system for guiding a user according to the present invention.

DESCRIPTION OF THE PREFERRED EMBODIMENT

FIG. 1 schematically shows a system for guiding a user 30 in a building. The building includes an elevator installation 1 with a first elevator 2, a second elevator 3 and a third elevator 4. The illustrated detail of the building shows, in the manner of a detail, a first floor 5 (underground car park), a second floor 6 (ground floor) and a third floor 7 (first floor), wherein in each floor 5, 6, 7 a respective door leads to one of the elevators 2, 3, 4. In addition, on each of the floors 5, 6, 7 a respective first communications unit in the form of a stationary terminal 10, 11, 12 is provided in the region of the elevator installation 1. The terminals 10, 11, 12 are each equipped with a control panel and a display and are connected by way of a data line with a central computer unit and a destination call control of the elevator installation.

A method for guidance of the user 30 in the building is explained in the following on the basis of this system. After the user 30 has driven by his or her motor vehicle into the underground car park 5 and has left the motor vehicle the user 30 approaches the elevator installation 1. As soon as the user 30 is located in the vicinity of the first terminal 10 the user holds, for example, a mobile telephone or a PDA (Personal Digital Assistant) 20, which is carried by the user and forms a second communications unit, at a spacing of a few decimeters from the terminal 10. The terminal 10 is equipped in such a manner that it transmits a contact signal within a predetermined range R of approximately ten meters in order to make contact with the mobile telephone 20. If the user 30 remains for a short period of time within this range R and the mobile telephone 20 receives the contact signal, contact is established. The position of the user 30 in the building is fixed within the scope of this established contact.

Based on the established contact a data communication between the terminal 10 and the mobile telephone 20 subsequently takes place. In this connection initially the access authorization of the user 30 is checked in the manner that the user 30 communicates by means of his or her mobile telephone 20 to the terminal 10 an access code filed on the mobile telephone 20. This communication can take place automatically, i.e. without the user 30 having to operate the mobile telephone 20, or by an appropriate operation of the mobile telephone 20 through a button input or a speech input. The access code can be, for example, a mobile telephone number or a serial number of a microchip of the mobile telephone. After a check of the access code communicated to the terminal 10 by the central computer unit and if a positive access authorization is established, data for guidance of the user 30 through the building are communicated by the computer unit via the first terminal 10 to the mobile telephone 20. These data make it possible for the user 30 to move in targeted manner through the building.

The content of the communicated data is in that case dependent on the position, which is fixed within the scope of the established contact, of the user 30 within the building and on the desired destination of the user 30. The destination is given by the user 30 to the terminal 10 by means of automatic transmission of a destination previously stored on the mobile telephone 20 or known through input of the destination at the mobile telephone 20 after entering the building.

The data communicated from the terminal 10 to the mobile telephone 20 contain, in particular, items of information about the location of the motor vehicle, such as, for example, the designation of the parking building, the parking floor and the parking place number, as well as, in dependence on the access authorization, an allocation to one of the elevators 2, 3, 4. Moreover, the computer unit determines on the basis of the position of the user 30 and/or the access authorization and/or a previously input destination call an elevator for serving the destination call. After transport of the user 30 to, for example, the third floor 7, in which in the case of the present example of embodiment the destination is located, the user 30 disembarks and goes, with the help of the data which was already communicated to the mobile telephone 20 and which the user reads off on the display of the mobile telephone 20, to the desired room in the third floor 7.

If the user 30 now wants to go back to his or her motor vehicle he or she moves, on the basis of the data already communicated and stored on the mobile telephone 20, initially to the third floor 7 in direction towards the elevator installation 1. As soon as the user 30 comes into the vicinity of the terminal 12 the mobile telephone 20 receives the contact signal transmitted from the terminal 12. In this connection the user 30 has to be located within the range R, for example at a distance of a meter from the terminal 12. After successful establishing of contact between the mobile telephone 20 and the terminal 12, the terminal 12 automatically asks the mobile telephone 20 for information about the location of the motor vehicle. In that case the terminal 12 recognizes the location description, which is filed on the mobile telephone 20, of the motor vehicle and thereupon determines an appropriate elevator for conducting the user 30 to his or her motor vehicle. An access code for entering the underground car park is transmitted simultaneously with the communication of the thus-determined data to the mobile telephone 20 for allocation of the user 30 to a suitable elevator. This access code is provided with a predetermined duration of validity so that the access code is automatically cancelled after leaving the building. After the user 30 has been transported to the first floor 5 by an elevator previously reserved by the destination call control the user 30 goes, by means of the communicated access code, into the underground car park and moves to his or her motor vehicle by way of the communicated data.

The afore-described method is distinguished particularly by the fact that the user 30 is guided solely by carrying the mobile telephone 20, without operation of the mobile telephone 20 necessarily being required, from entry of the building to his or her destination and until leaving the building. Alternatively, the user can operate the mobile telephone 20 at least temporarily and/or for transmission/reception of specific data.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of guiding a user in a building having an elevator installation, wherein at least one first communications unit communicates data to a second communications unit, the method comprising the steps of:

transmitting a contact signal from the first communications unit within a predetermined range for initiating and establishing contact with the second communications unit, wherein the first communications unit is a stationary terminal provided in a region of the elevator installation, outside of an elevator, and connected with a central computer unit and a destination call control of the elevator installation, and wherein the predetermined range is within a predefined distance between the first communications unit and the second communications unit, wherein the second communications unit is mobile and carried by the user;

establishing contact between the first communications unit and the second communications unit when the second communications unit is located within the range and receives the contact signal, wherein a position of the user in the building is fixed within the scope of the established contact;

after the contact has been established, the first communications unit receiving from the second communications unit through the contact a desired destination previously stored in the second communications unit or inputted at the second communications unit after entering the building; and communicating the data from the first communications unit through the contact to the second communications unit for guidance of the user through the building by the second communications unit when the second communications unit is located within the range and the contact is established and after the first communications unit has received from the second communications unit the desired destination, whereby the content of the communicated data is dependent on the position of the user in the building and on the desired destination of the user.

2. The method according to claim 1 including the first communications unit receiving from the second communications unit an access code communicated as a mobile telephone number or a serial number of a microchip of the second communications unit.

3. The method according to claim 1 wherein said step of communicating the data is performed by checking an access authorization of the user to the building before the communication of the data from the first communications unit to the second communications unit and communicating the data only if the check is successful.

4. The method according to claim 1 wherein the data are communicated to the second communications unit in said step of communicating the data in dependence upon an access authorization.

5. The method according to claim 1 including upon communication of the data from the first communications unit to the second communications unit in said step of communicating the data an access code for access to specific regions of the building is communicated.

6. The method according to claim 1 including the first communications unit receiving an access code communicated from the second communications unit.

7. The method according to claim 6 wherein the access code is communicated only at specific points in time or within a specific time period.

8. The method according to claim 1 wherein the data are communicated only at specific points in time or within a specific time period from the first communications unit to the second communications unit or received by the first communications unit from the second communications unit.

9. The method according to claim 1 wherein the first communications unit receives communication of specific data selected by the second communications unit.

10. The method according to claim 1 wherein the contact signal is transmitted at specific times or over a specific time period.

11. The method according to claim 1 wherein the data is made known to the user by an indicating unit.

12. The method according to claim 1 wherein the data is made known to the user by an optical indicating unit.

13. The method according to claim 1 wherein the second communications unit is a mobile telephone or a PDA.

14. The method according to claim 1 wherein the first communications unit is a fixed-position terminal.

15. The method according to claim 1 wherein that the range is less than approximately 10 meters.

16. The method according to claim 1 including the following steps:

the first communications unit receiving identification code from the second communications unit for confirmation of established contact;

storing the obtained identification code and the location where the identification code was received in the first communications unit;

on a subsequent establishing of contact between the first communications unit and the second communications unit, the first communications unit using the identification code to read the location obtained in said step of storing the obtained identification code; and guiding, with the help of the location, the user back to his or her starting point by communication of the data from the first communications unit to the second communications unit.

17. An elevator installation for guiding a user in a building, the elevator installation comprising:

at least one first communications unit, the at least one first communications unit being a stationary terminal provided in a region of the elevator installation, outside of an elevator, and configured to transmit a contact signal within a predetermined range in the building for initiating and establishing contact with a second communications unit, wherein a position of the user in the building is fixed within the scope of the established contact, and wherein the second communication unit is mobile and carried by the user;

a central computer unit connected to the at least one first communications unit; and a destination call control connected to the at least one first communications unit;

whereby the at least one first communications unit is configured to establish contact with the mobile second communications unit when the mobile second communications unit is located within the predetermined range and receives the contact signal;

whereby the at least one first communications unit is configured to, after the contact has been established, receive from the mobile second communications unit through the contact a desired destination previously stored in the mobile second communications unit or inputted at the mobile second communications unit after entering the building;

whereby the at least one first communications unit is configured to, after the contact has been established and after the first communications unit has received from the second communications unit the desired destination, communicate data through the contact to the mobile second communications unit for guidance of the user through the building by the mobile second communications unit; and whereby the content of the communicated data is dependent on the position of the user in the building and on the desired destination of the user.

18. An apparatus comprising:

a stationary terminal provided in a region of the elevator installation in a building, outside of an elevator, the stationary terminal being configured to, transmit a contact signal within a predetermined range of the stationary terminal for initiating and establishing contact with a mobile communications unit, establish contact with the mobile communications unit located within the predetermined range using the contact signal, wherein a position of the user in the building is fixed within the scope of the established contact, receive from the mobile communications unit, through the contact that is established, a desired destination previously stored in the mobile communications unit or inputted at the second communications unit after entering the building, and communicate direction data through the contact to the mobile communications unit for guidance through the building by the mobile communications unit after the stationary terminal has received from the mobile communications unit the desired destination, whereby the content of the direction data is dependent on the position of the user in the building and on the desired destination of the user.

* * * * *